(12) United States Patent
Wang et al.

(10) Patent No.: US 9,202,118 B2
(45) Date of Patent: Dec. 1, 2015

(54) DETERMINING A PIXEL CLASSIFICATION THRESHOLD FOR VEHICLE OCCUPANCY DETECTION

(75) Inventors: Yao Rong Wang, Webster, NY (US); Beilei Xu, Penfield, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 945 days.

(21) Appl. No.: 13/324,308

(22) Filed: Dec. 13, 2011

(65) Prior Publication Data

US 2013/0147959 A1 Jun. 13, 2013

(51) Int. Cl.
*G06K 9/00* (2006.01)

(52) U.S. Cl.
CPC .................................. *G06K 9/00838* (2013.01)

(58) Field of Classification Search
CPC .............................. G06K 9/00838; H04N 7/18
See application file for complete search history.

(56) References Cited

U.S. PATENT DOCUMENTS

| 6,370,260 | B1 * | 4/2002 | Pavlidis et al. | 382/103 |
| 6,829,370 | B1 | 12/2004 | Pavlidis et al. | |
| 7,469,060 | B2 | 12/2008 | Bazakos et al. | |
| 2013/0148845 | A1 * | 6/2013 | Maeda | 382/103 |

OTHER PUBLICATIONS

Mikael Nilsson, et al., "Face Detection Using Local SMQT Features and Split Up SNoW Classifier", Blekinge Inst. of Tech., School of Eng., Ronneby, Sweden, Int'l Conf. Acoustics Speech and Signal Proc. (ICASSP), 589-592, ISSN: 1520-6149, Honolulu, HI (Apr. 2007).
K. Somashekar, et al., "Face Detection by SMQT Features and SNoW Classifier Using Color Information", Int'l Journal of Eng. Science and Technology (IJEST), vol. 3, No. 2, pp. 1266-1272, (Feb. 2011).
Wang, et al., "Determining a Total Number of People in an IR Image Obtained Via an IR Imaging System", U.S. Appl. No. 12/967,775, filed Dec. 14, 2010.
Mestha et al., "Method for Classifying a Pixel of a Hyperspectral Image in a Remote Sensing Application", U.S. Appl. No. 13/023,310, filed Feb. 8, 2011.
Fan et al., "Front Seat Vehicle Occupancy Detection Via Seat Pattern Recognition", U.S. Appl. No. 13/215,401, filed Aug. 23, 2011.

(Continued)

*Primary Examiner* — Sath V Perungavoor
*Assistant Examiner* — Clifford Hilaire
(74) *Attorney, Agent, or Firm* — Philip E. Blair; Fleit Gibbons Gutman Bongini & Bianco P.L.

(57) ABSTRACT

What is disclosed is a system and method for determining a pixel classification threshold for vehicle occupancy determination. An IR image of a moving vehicle is captured using a multi-band IR imaging system. A driver's face is detected using a face recognition algorithm. Multi-spectral information extracted from pixels identified as human tissue of the driver's face is used to determine a pixel classification threshold. This threshold is then used to facilitate a classification of pixels of a remainder of the IR image. Once pixels in the remainder of the image have been classified, a determination can be made whether the vehicle contains additional human occupants other than the driver. An authority is alerted in the instance where the vehicle is found to be traveling in a HOV/HOT lane requiring two or more human occupants and a determination has been made that the vehicle contains an insufficient number of human occupants.

20 Claims, 8 Drawing Sheets

(56) References Cited

OTHER PUBLICATIONS

Wang et al., "Determining a Number of Objects in an IR Image", U.S. Appl. No. 13/086,006, filed Apr. 13, 2011.
Dalal, et al., "Vehicle Occupancy Detection Via Single Band Infrared Imaging", U.S. Appl. No. 13/312,414, filed Dec. 6, 2011.
Xu, et al., "System and Method for object Identification and Tracking", U.S. Appl. No. 13/247,343, filed Sep. 28, 2011.

\* cited by examiner

DETERMINING A PIXEL CLASSIFICATION THRESHOLD FOR VEHICLE OCCUPANCY DETECTION

TECHNICAL FIELD

The present invention is directed to systems and methods which use an infrared camera system to obtain a multi-band IR image of a motor vehicle and then determining the total number of human occupants in that vehicle.

BACKGROUND

Vehicles carrying multiple passengers reduce fuel consumption, pollution, and highway congestion, relative to single-occupancy vehicles. Highway authorities provide various incentives for high occupancy vehicles which include allowing such vehicles to travel in traffic lanes limited to high occupancy vehicles (HOV lanes) and traffic lanes where a toll charged is reduced or eliminated for high occupancy vehicles (HOT lanes). Penalties are imposed on drivers of vehicles travelling with less than a predefined number of occupants (e.g., less than 2). Recent efforts have been directed toward sensing and image capture systems and methods to effectuate HOV lane enforcement. Manual enforcement of HOV/HOT lanes by law enforcement can be difficult and potentially hazardous. Pulling violating motorists over to issue tickets tends to disrupt traffic and can become a safety hazard for both the officer and the vehicle's occupant. Consequently, automated occupancy detection (i.e., the ability to automatically detect human occupants of vehicles), preferably coupled with automated vehicle recognition and ticket mailing, is desirable. Further development in this art is needed for automated solutions for determining the number of human occupants in a motor vehicle. While ordinary visible light can be used for vehicle occupancy detection through the front windshield under ideal conditions, there are shortcomings. For example, cabin penetration with visible light can be easily compromised by factors such as tinted windshields as well as environmental conditions such as rain, snow, dirt, and the like. Moreover, visible illumination at night may be distracting to drivers. Near infrared illumination has advantages over visible light illumination including being unobservable by drivers. Development in this art is ongoing as methods are need to analyze IR images captured of a moving motor vehicle and processing that image to determine a total number of human occupants in that vehicle. Vehicle occupancy detection methods often rely on prior knowledge of the reflectance spectrum of skin to determine a human occupant in an IR image. While such occupancy detection methods using skin spectral information in a multi-band camera system can give accurate occupancy detection, such methods require re-setting a value for a comparison threshold when environment conditions change.

Accordingly, what is needed in this art are increasingly sophisticated systems and methods which is robust to changing conditions by utilizing the spectral information of pixels of the driver to determine a threshold value used for pixel classification. The teachings hereof compliment previously disclosed pixel classification methods by Wang et al.

INCORPORATED REFERENCES

The following U.S. patents, U.S. patent applications, and Publications are incorporated herein in their entirety by reference.

"Determining A Total Number Of People In An IR Image Obtained Via An IR Imaging System", U.S. Pat. No. 8,520,074.

"Determining A Number Of Objects In An IR Image", U.S. Pat. No. 8,587,657.

"Method For Classifying A Pixel Of A Hyperspectral Image In A Remote Sensing Application", U.S. Pat. No. 9,019,358 Ser. No. 13/023,310, by Mestha et al.

"*Face Detection Using Local SMQT Features And Split Up SNoW Classifier*", by Mikael Nilsson, Jorgen Nordberg, and Ingvar Claesson, Blekinge Inst. of Tech., School of Eng., Ronneby, Sweden, Int'l Conf. Acoustics Speech and Signal Proc. (ICASSP), 589-592, ISSN: 1520-6149, Honolulu, Hi. (April 2007).

"*Face Detection By SMQT Features And SNoW Classifier Using Color Information*", K. Somashekar, C. Puttamadappa, and D. N. Chandrappa, Int'l Journal of Eng. Science and Technology (IJEST), Vol. 3, No. 2, pp. 1266-1272, (February 2011).

BRIEF SUMMARY

What is disclosed is a system and method for determining a pixel classification threshold which does not rely on prior knowledge of the reflectance of human tissue. The present method utilizes multi-spectral information extracted from human tissue pixels found in a region of the vehicle's front windshield containing the driver's face to determine a classification threshold used for classifying pixels in a remainder of the image. The present method is robust against various conditions such as, for instance, temperature, precipitation, fog, cloudiness, etc., likely to cause pixels in an IR image to be incorrectly classified.

One embodiment of the present method for determining a pixel classification threshold for vehicle occupancy determination is as follows. First, an IR image of a moving vehicle intended to be analyzed for human occupancy detection is captured using a multi-band IR imaging system. The windshield area of the vehicle is clipped from the image for processing. A driver's facial area is detected in the image using a face detection algorithm. Multi-spectral information is extracted from the pixels identified as human tissue comprising the driver's face. The multi-spectral information is then used, in a manner more fully disclosed herein, to determine a pixel classification threshold. This threshold is then used to facilitate a classification of pixels of a remainder of the IR image. Once pixels in the remainder of the image have been classified, a determination can be made whether the vehicle contains additional human occupants other than the driver. An authority is alerted in the instance where the vehicle is found to be traveling in a HOV/HOT lane requiring two or more human occupants and a determination has been made that the vehicle contains an insufficient number of human occupants. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for pixel classification which utilizes multi-spectral information of pixels known to belong to the driver's human tissue to derive a threshold value which, in turn, is used to classify pixels in a remaining portion of the image such that a number of human occupants in the vehicle can be determined.

It should be appreciated that, in many countries, automobiles are designed such that the driver sits on the right hand side of the front passenger compartment and the passenger sits on the left hand side of the front passenger compartment taken from the viewpoint of standing in the front of the vehicle and looking at the front windshield. In other countries, automobiles are designed so that the driver is on the left hand side and the passenger is on the right hand side of the front passenger compartment from the same viewpoint. As such, any discussion herein referring to left and right side of the passenger compartment is intended to cover both designs and should not be viewed as limiting in any way.

Non-Limiting Definitions

An "image of a motor vehicle" means either a still image or video images of a motor vehicle obtained using an IR imaging system. A single frame of a fully-populated IR image consists of an array of pixels with each pixel having a respective intensity value measured at a desired spectral wavelength band of interest.

Figure 1:
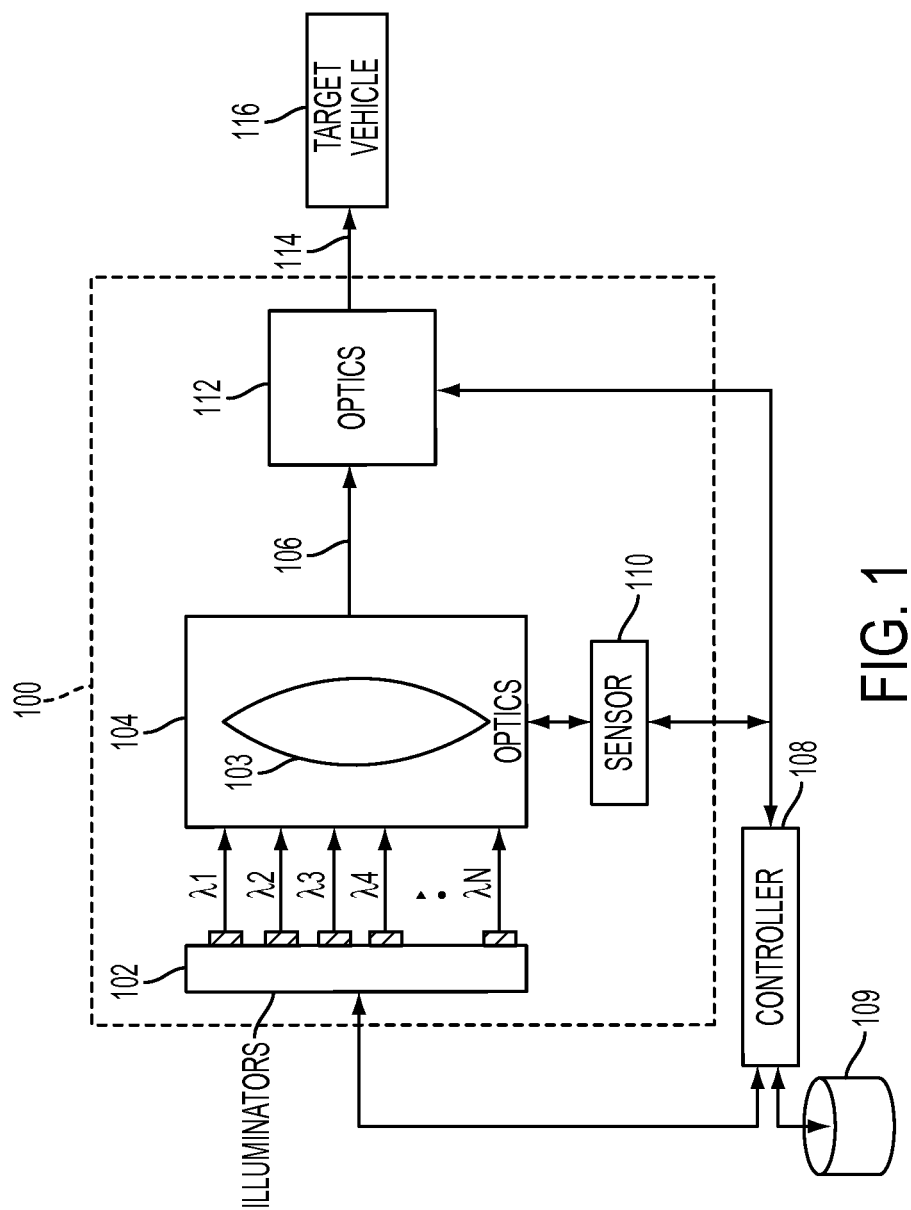
FIG. 1 illustrates one embodiment of an example IR illumination system 100.
Figure 2:
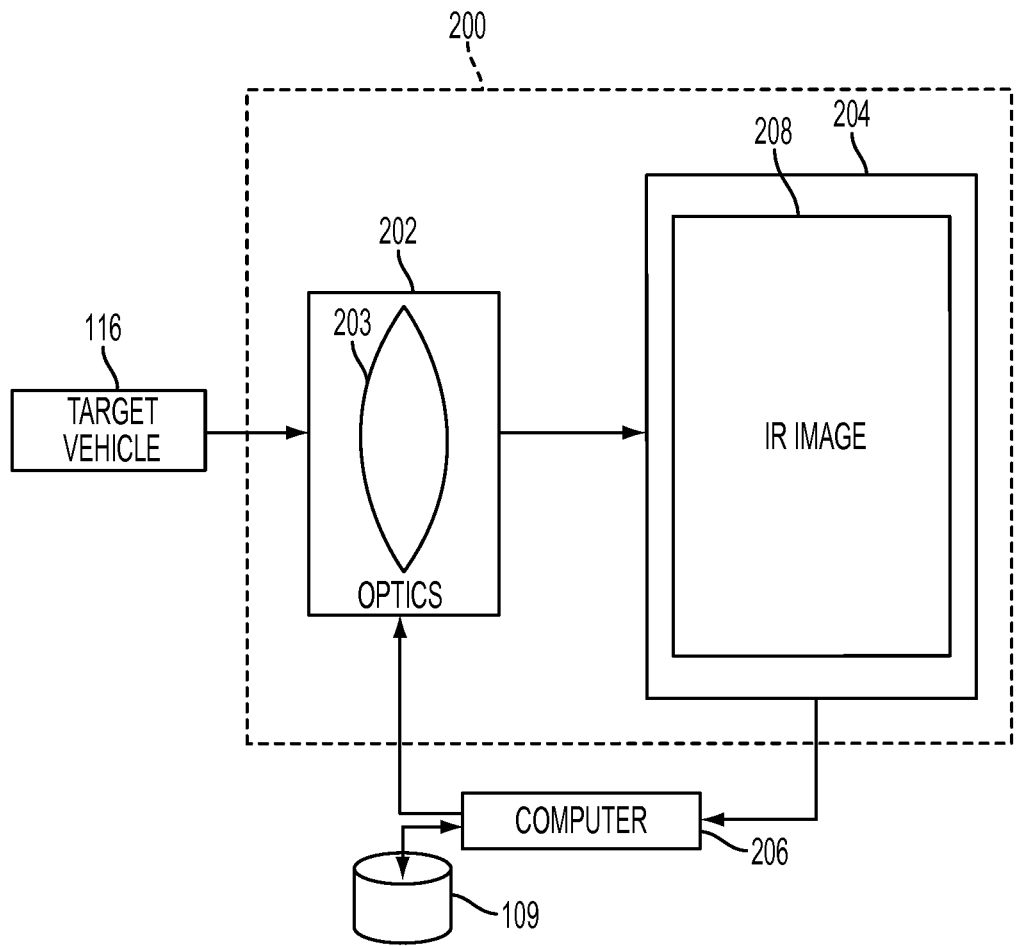
FIG. 2 illustrates one embodiment of an example IR detection system 200.

A "multi-band IR imaging system" is an apparatus comprising an IR illuminator and an IR detector designed to capture IR light reflected from a target object, separate it into its component wavelengths, and output an IR image of the target. The IR image is captured over multiple wavelength bands of interest. An IR imaging system can be either a single IR detection device and a sequentially illuminated N-band illuminator (N≥3) with one fixed filter, or comprise a total of N detector (N≥3) each having a respective band pass filter and a single illuminator. An example IR illumination system is shown in FIG. 1. An example IR detection system is shown in FIG. 2.

A "pixel classification threshold" is a value which identifies a line of separation of pixels which can be categorized as human tissue from pixels categorized as other materials such as, for example, seat fabric, leather, metals and plastics, etc.

A "correlation method" refers to a method of pixel classification wherein pixels of an IR image are classified as human tissue based upon an amount of correlation between a captured intensity of that pixel and a (scaled) intensity calculated from a model comprising:

$$I_c(i) = \alpha \int_{\lambda_1}^{\lambda_2} I_s(\lambda) T_G^2(\lambda) F_i(\lambda) R_o(\lambda) D(\lambda) d\lambda, \quad (1)$$

where $I=1, 2 \ldots N$ stands for the $i^{th}$ IR band using $i^{th}$ filter $F_i(\lambda)$, $I_s(\lambda)$ is the power spectrum of the IR illuminator, $R_o(\lambda)$ is the reflectance of the object inside the vehicle, $T_G(\lambda)$ is the transmittance of the vehicle's glass window, $D(\lambda)$ is a responsivity of the IR detector, $\lambda_1$ and $\lambda_2$ specify the wavelength range over which the camera detector integrates the light, and the constant $\alpha$ depends on the angle and distance from IR illuminator, pixel size, and the camera's integration time.

The correlation method uses a materials spectra database containing pre-measured reflectances of known materials such as human skin and hair, and other materials of interest. The database includes the transmittance of windshield glass, the power spectra of the IR illuminator(s), the filter transmittances, and a responsivity curve of the IR detector(s). A theoretical pixel intensity for each object in the image can be calculated and the measured intensity of each pixel can be compared with the theoretical intensities to determine an amount of correlation therebetween. In one embodiment, the correlation coefficient (for each pixel) is given by:

$$C = \frac{\sum_{i=1}^{i=N}[I_{cm}(i)][I_{cs}(i)]}{\sqrt{\sum_{i=1}^{i=N}[I_{cm}(i)]^2}\sqrt{\sum_{i=1}^{i=N}[I_{cs}(i)]^2}}, \quad (2)$$

where $I_{cm}(i)$ is the captured intensity of a pixel from the $i^{th}$ wavelength band, $I_{cs}(i)$ is the intensity of a pixel of the human tissue of the driver, and N is the total number of wavelength bands of the multi-band IR imaging system. If the intensity of the driver's facial pixel (with a particular reflectance) agrees with the measured intensity of the pixel of the object, then the correlation will be high (close to 1). Otherwise, the correlation will be low (close to 0 or negative). Pixels are classified based upon a comparison with a threshold given by:

$$C_{th} = C_m - \beta V_c, \quad (3)$$

where $C_m$ is a mean of correlation coefficient values of pixels of the driver's face, $V_c$ is a variance of the correlation, and $\beta$ is a pre-determined constant which balances a percentage of human tissue pixels to be included before too many non-skin pixels are also included.

A "ratio method" is a pixel classification method classifies a pixel as human tissue vs. other materials if the ratio (of Eq. 5) is larger or smaller than a predetermined threshold value. In one embodiment, this ratio comprises:

$$\frac{I_{cm}(i)}{I_{cm}(j)} \quad (5)$$

where i,j are any N-band indices different from each other (see, Eq. 1). Pixels are classified based upon a comparison to a pixel classification threshold given by:

$$S_{th} = S_m - \gamma V_s, \quad (6)$$

where $S_m$ is a mean of intensity ratio values of pixels of the driver's face, $V_s$ is a variance of the ratio, and $\gamma$ is a predetermined constant which balances a percentage of human tissue pixels to be included before too many non-human tissue pixels are also included.

Example IR Illuminator

Reference is now being made to FIG. 1 which illustrates one embodiment of an example IR illumination system 100 for use in accordance with the teachings hereof.

The IR illumination system of FIG. 1 is shown comprising a plurality of IR light sources 102 each emitting a narrow band of IR radiation at a respective peak wavelength $(\lambda_1, \ldots, \lambda_n)$. Light source 102 is an array of light emitting diodes (LEDs). Each diode is pre-selected to emit radiation at a particular wavelength band of interest, and defines a source in the array for that wavelength band. Controller 108 is coupled to source array 102 and controls the input current to each illuminator and, thereby, the output intensity of each. Sensing optics 104 has optics 103 which combine the wavelengths to produce IR illumination beam 106. Sensor 110 samples the radiation emitted from the array of IR light sources and provides feedback to controller 108. Focusing optics 112 receives beam 106 and focuses output beam 114 onto vehicle 116. Optics 112 includes a plurality of lens of varying focal lengths positioned in the beam path to focus the beam as desired. Controller 108 is also coupled to optics 112 to effectuate changes in output beam 114 due to target size, target distance, target speed, to name a few constraints. Controller 108 is in communication with storage device 109 to store/retrieve calibration information, intensity levels, and the like, including data and machine readable program instructions. Controller 108 may comprise a computer system such as a desktop, laptop, server, mainframe, and the like, or a special purpose computer system such as an ASIC. Controller 108 may be placed in wired or wireless communication with a computing workstation over a network. Such a network may be a local area network (LAN) or the Internet. It should be appreciated that any of the components of IR illumination system 100 may be placed in communication with such a computing system to facilitate the intended purposes hereof.

Any of the optics described with respect to IR illumination system 100 of FIG. 1 can be replaced with an optical system having optical power and may further include mirrors. Such an optical system may include multiple components each having optical power, e.g., it may be doublet or a triple lens. In the limit that such optical systems define a unique focal length F, the source array and grating would be positioned in the front and back focal planes of the optics. As a result, the optical system images the grating at infinity with respect to each element of the light source array and thus each source element sees the same region of the grating. The light from each element would be coextensive on that region. The grating can then produce output radiation whose spectral content is substantially uniform across its transverse profile by compensating for the dispersion associated with lateral position of the different wavelength band sources. This, in turn, allows the spectral content of output beam 114 to be substantially uniform across its transverse profile. In practice, it may be difficult to precisely define a desired focal length for the optical system because of aberrations (e.g., field curvature, axial chromatic, lateral chromatic, distortion, coma, and the like), which may cause the optics to focus rays to slightly different positions according to their wavelength or their lateral positioning.

In addition, the relative positions of the optical system, the source array, and the grating, are selected according to the more general condition that the optical system images the grating at infinity with respect to each source element of the light source array, at least for paraxial rays that emerge from each source. For a ray propagating at an angle $\theta$ to the optical axis, a paraxial ray has: $\sin(\theta) \approx \theta$. This infinity condition can be achieved by positioning each source element at a nominal back focal plane of the optical system to within the depth of field of the optical system, and positioning the grating at nominal front focal plane of the optical system to within the depth of field of the optical system. The depth of field (DOV) is related to the numerical aperture (NA) of the optical system according to: $DOV=\lambda/NA^2$, where $\lambda$ is the wavelength of the light from the source element. The optics may be designed with components to provide multiple degrees of freedom to compensate for various optical aberrations. Although additional components in the optical system provide additional degrees of freedom for reducing aberrations, each additional component also adds cost and complexity to the optical system.

Example IR Detector

Reference is now being made to FIG. 2 which illustrates one embodiment of an example IR detection system 200 for use in accordance with the teachings hereof.

Target vehicle 116 reflects the IR output beam 114 emitted by focusing optics 112 of the IR illumination system of FIG. 1. A portion of the reflected IR light is received by optics 202 having lens 203 that focus the received light onto sensor(s) 204 which spatially resolves the received light to obtain IR image 208. Optics 202 may also include one or more bandpass filters that only allow light in a narrow wavelength band to pass though the filter. The filters may also be sequentially changed to obtain N intensities at 208. Sensor 204 sends the IR image information to computer 206 for processing and storage. Detector 208 is a multispectral image detection device whose spectral content may be selectable through a controller (not shown). Detector 204 records light intensity at multiple pixels locations along a two dimensional grid. Optics 202 and detector 204 include components commonly found in various streams of commerce. Suitable sensors include charge-coupled device (CCD) detectors, complementary metal oxide semiconductors (CMOS) detectors, charge-injection device (CID) detectors, vidicon detectors, reticon detectors, image-intensifier tube detectors, pixelated photomultiplier tube (PMT) detectors, InGaAs (Indium Gallium Arsenide), Mercury Cadmium Telluride (MCT), and Microbolometer. Computer 206 is in communication with optics 202 to control the lens thereof and is in communication with detector 204 to control the sensitivity thereof. Computer 206 receives sensitivity values associated with each pixel of IR image 208. Computer 206 includes a keyboard, monitor, printer, etc. (not shown) as are necessary to effectuate a control of various elements of IR detection system 200.

Example HOT/HOV Camera System

Figure 3:
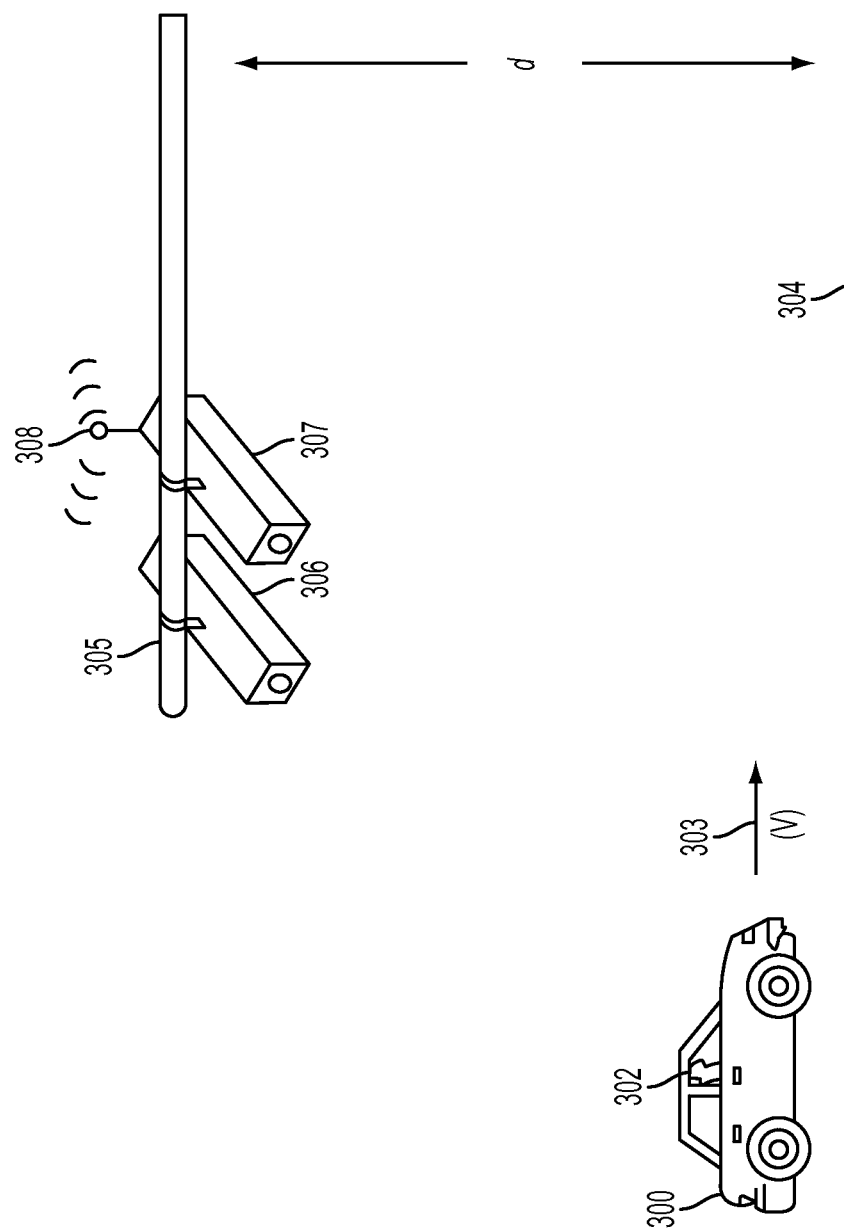
FIG. 3 shows an example vehicle occupancy detection system which incorporates the IR illumination system of FIG. 1 and the IR detection system of FIG. 2.

Reference is now being made to FIG. 3 which shows an example vehicle occupancy detection system which incorporates the IR illumination system of FIG. 1 and the IR detection system of FIG. 2, wherein various aspects of the teachings hereof find their intended uses.

In FIG. 3, vehicle 300 contains driver 302. Vehicle 300 is traveling at velocity v in a direction of motion indicated by vector 303 along HOV lane 304, and is intended to be processed herein for vehicle occupancy detection. Positioned at distance d above lane 304 is support arm 305 which, in various embodiments, comprises a tubular construction similar to that used to support traffic lights and street lights. Fixed onto support arm 305 are IR detection system 307 and IR illumination system 306. Systems 306 and 307 are intended to represent embodiments discussed with respect to FIGS. 1 and 2, respectively. IR illuminator 306 emits IR light at desired wavelengths of interest. IR detector 307 is shown having a Tx/Rx element 308 for communicating captured IR images and/or pixel intensity values to a remote device, such as the system of FIG. 7, for processing in accordance with the teachings hereof. The system of FIG. 3 is preferably configured such that the IR detector's field of view (FOV) covers a single lane. Operationally, a vehicle enters a detection zone and the IR camera is activated via a triggering mechanism such as, for instance, an underground sensor, a laser beam, and the like. Images of the motor vehicle are captured for processing. It should be appreciated that the various elements of FIG. 3 are illustrative and are shown for explanatory purposes.

Front Passenger Compartment

Figure 4:
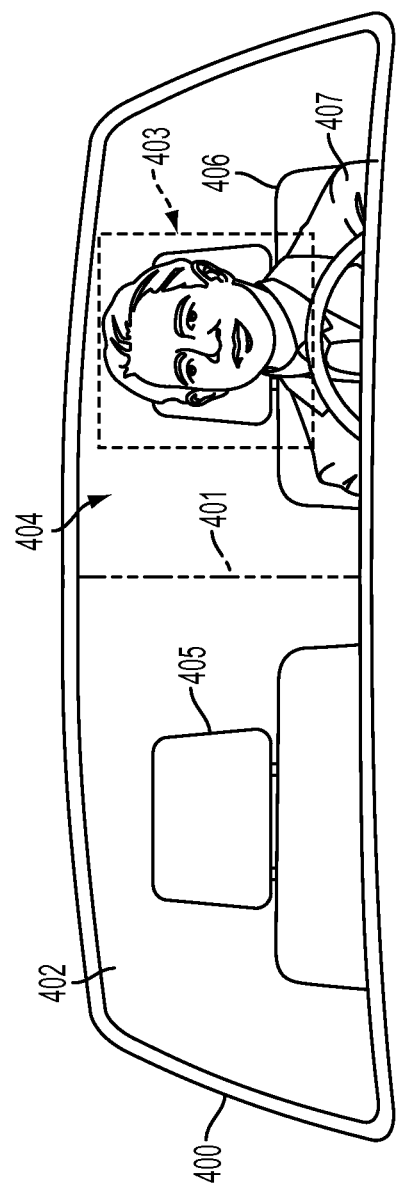
FIG. 4 shows a front windshield area which has been clipped from an image of the motor vehicle of FIG. 3 obtained using the IR illuminator and IR detector of FIGS. 1 and 2, respectively.

FIG. 4 illustrates an example front passenger compartment of motor vehicle 400 taken from the front of the vehicle through the front windshield 402. Front passenger seat 405 is unoccupied while the driver's seat 406 contains driver 407. Windshield area 402 has been clipped from the IR image captured of motor vehicle 300 by the IR imaging system of FIG. 3 as that vehicle traveled down HOV/HOT lane 304. Windshield 402 is shown partitioned by dividing line 401 into a driver's side and a passenger's side of the vehicle's front passenger compartment. The driver's head (shown in region 403) having been isolated in the image using a face detection algorithm. In accordance with the teachings hereof, intensity values of pixels in the driver's facial region are used to effectuate a determination of a pixel classification threshold which, in turn, is used to classify pixels in a remaining portion of the IR image such that a total number of human occupants in the vehicle can be determined.

Example Flow Diagram

Figure 5:
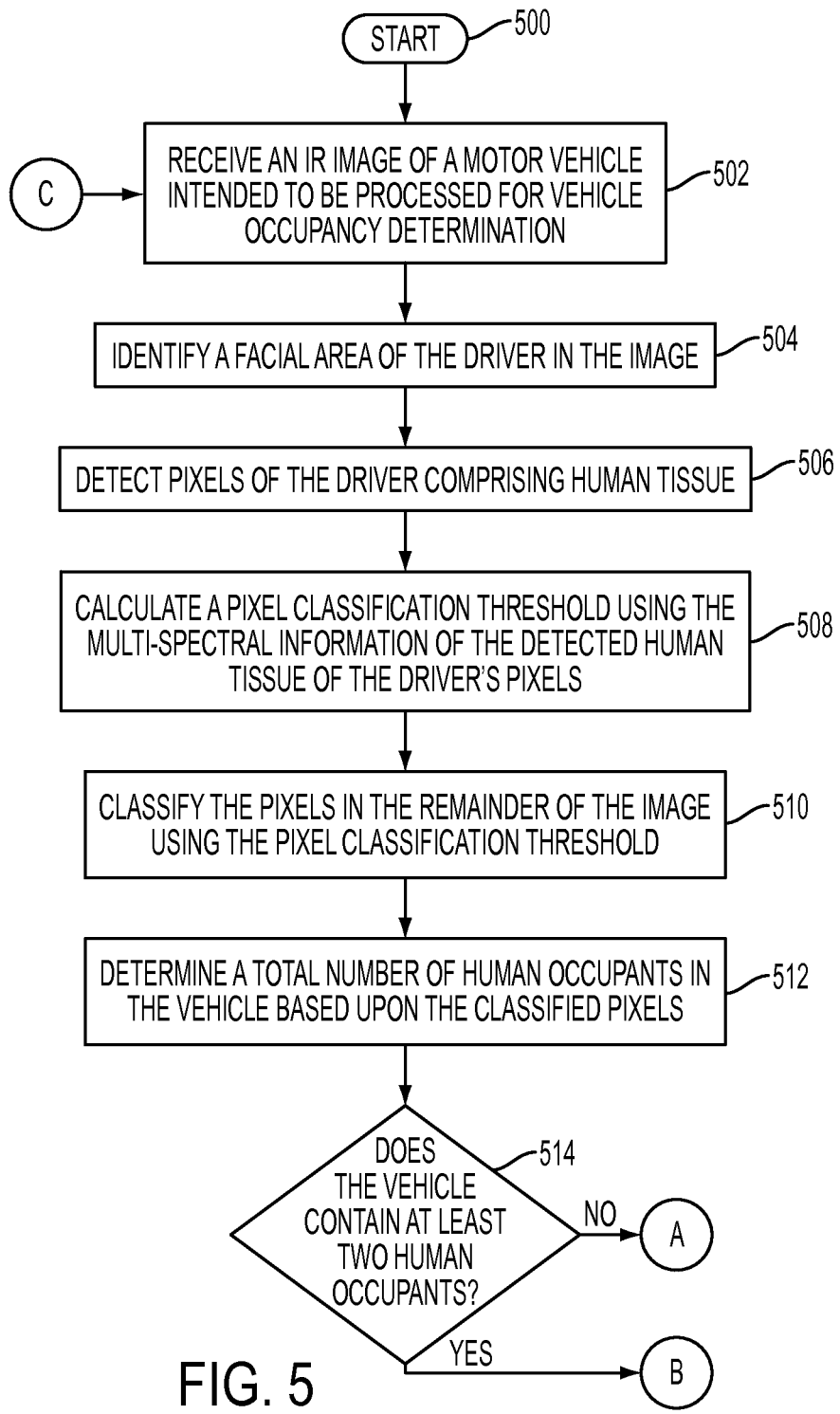
FIG. 5 is a flow diagram which illustrates one example embodiment of the present method for determining a threshold for pixel classification in the vehicle occupancy detection system of FIG. 3.

Reference is now being made to the flow diagram of FIG. 5 which illustrates one example embodiment of the present method for determining a threshold for pixel classification. Flow processing beings at 500 and immediately proceeds to step 502.

At step 502, an IR image of a moving vehicle intended to be analyzed for human occupancy detection is captured using a multi-band IR imaging system comprising an IR detector and an IR Illuminator. An example IR illumination system is shown and discussed with respect to FIG. 1. An example IR detection system is shown and discussed with respect to FIG. 2. An example vehicle occupancy detection system used to capture an IR image of a motor vehicle traveling in a HOV/HOT lane is shown and discussed with respect to FIG. 3. The IR image may be received from transmitter 308 of FIG. 3, or from a remote device over a network. Once example networked computer workstation is shown and discussed with respect to FIG. 7. Captured images may be processed automatically or stored to a memory or storage device for processing in accordance with the teachings hereof. Such embodiments are intended to fall within the scope of the appended claims. A front windshield area may be clipped from the image for processing, such as that of FIG. 4. Techniques for identifying, isolating, and clipping a portion of an image are well established in the image processing arts. Therefore, a discussion as to a particular method has been omitted herein. The windshield area may be manually clipped using, for example, an image manipulation software tool and a graphical user interface of a computer workstation.

At step 504, a facial area of the driver of the vehicle is identified in the driver's portion of the front passenger compartment. A driver's face can be identified in the image using a facial recognition software algorithm. Such algorithms provide high recognition capability, especially if a candidate region of the image where a face is likely to be found has already been identified by, for instance, dividing the front windshield area of the vehicle into a passenger side and a driver's side area and, once divided, isolating a candidate region where a driver's head is likely to be found. The candidate region can be identified in the driver's half of the front passenger compartment using known locations of one or more car parts such as, for example, a steering wheel, rear-view mirror or side-view mirror, a head rest of the driver's seat, and the like.

At step 506, pixels of human tissue of the driver's head are detected in the IR image in the location identified by the facial recognition algorithm. It should be appreciated that human tissue pixels need not only be those of the driver's face but may be the driver's hand positioned on the steering wheel or a portion of the driver's arm which has been detected or otherwise identified in the image.

At step 508, multi-spectral information of the pixels of human tissue of the driver (of step 506) are used to determine a pixel classification threshold in a manner previously discussed.

At step 510, the pixel classification threshold is used to classify human tissue pixels in a remainder of the image.

At step 512, a number of human occupants in the vehicle is determined based upon the classified pixels.

At step 514, a determination is made whether the vehicle contains at least two human occupants. If it is determined that the vehicle does not contain at least two human occupants then processing continues with respect to node A of FIG. 6 wherein, at step 516, a determination is made that a traffic violation has occurred. This determination can be readily effectuated by comparing the total number of human occupants determined for this vehicle the number of occupants required to be in the vehicle at the time the vehicle was detected in the HOV/HOT lane.

At step 518, a law enforcement or traffic authority is notified that the vehicle in the image is traveling in the HOV/HOT lane at a specified time of day, without the required number of human occupants. Law enforcement can then isolate the license plate number of this vehicle and issue a traffic citation to the registered owner of the vehicle. Thereafter, flow processing continues with respect to node C wherein, at step 502, another IR image of a motor vehicle intended to be processed for vehicle occupancy detection is captured or is otherwise received and processing repeats in a similar manner for this next image. If, at step 514, it is determined that this vehicle contains at least two human occupants then processing continues with respect to node B wherein, at step 520, a determination is made that no traffic violation has occurred. This particular image may be stored to a storage device for a predetermined amount of time or summarily discarded. Flow processing continues with respect to node C of FIG. 5 wherein, at step 502, another IR image of a motor vehicle is received for processing. Processing repeats in a similar matter until there are no more images or until the system is taken off-line for servicing or repair. In another embodiment, further processing stops after a predetermined number of images have been processed.

Figure 6:
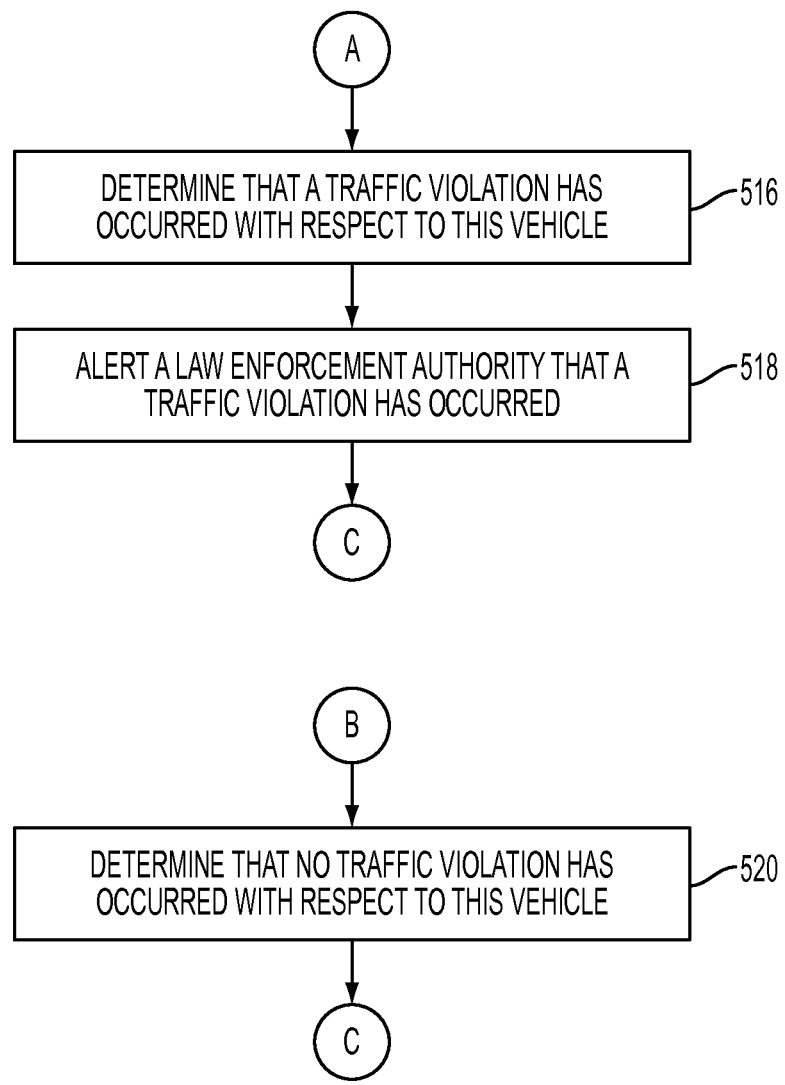
FIG. 6 is a continuation of the flow diagram of FIG. 5 with flow processing continuing with respect to nodes A and B.

It should be appreciated that various aspects of the embodiment of the flow diagrams of FIGS. 5-6 are intended to be used in HOV/HOT detection systems where a violation occurs when the motor vehicle does not contain at least two passengers. Some traffic authorities require more than two passengers for a given vehicle to be authorized to travel in their respective HOV/HOT lanes during a particular time of day. The methods hereof are intended to be applied to those situations as well.

It should be understood that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims. All or portions of the flow diagrams may be implemented partially or fully in hardware in conjunction with machine executable instructions in communication with various components of a vehicle occupancy detection system.

Example Processing System

Figure 7:
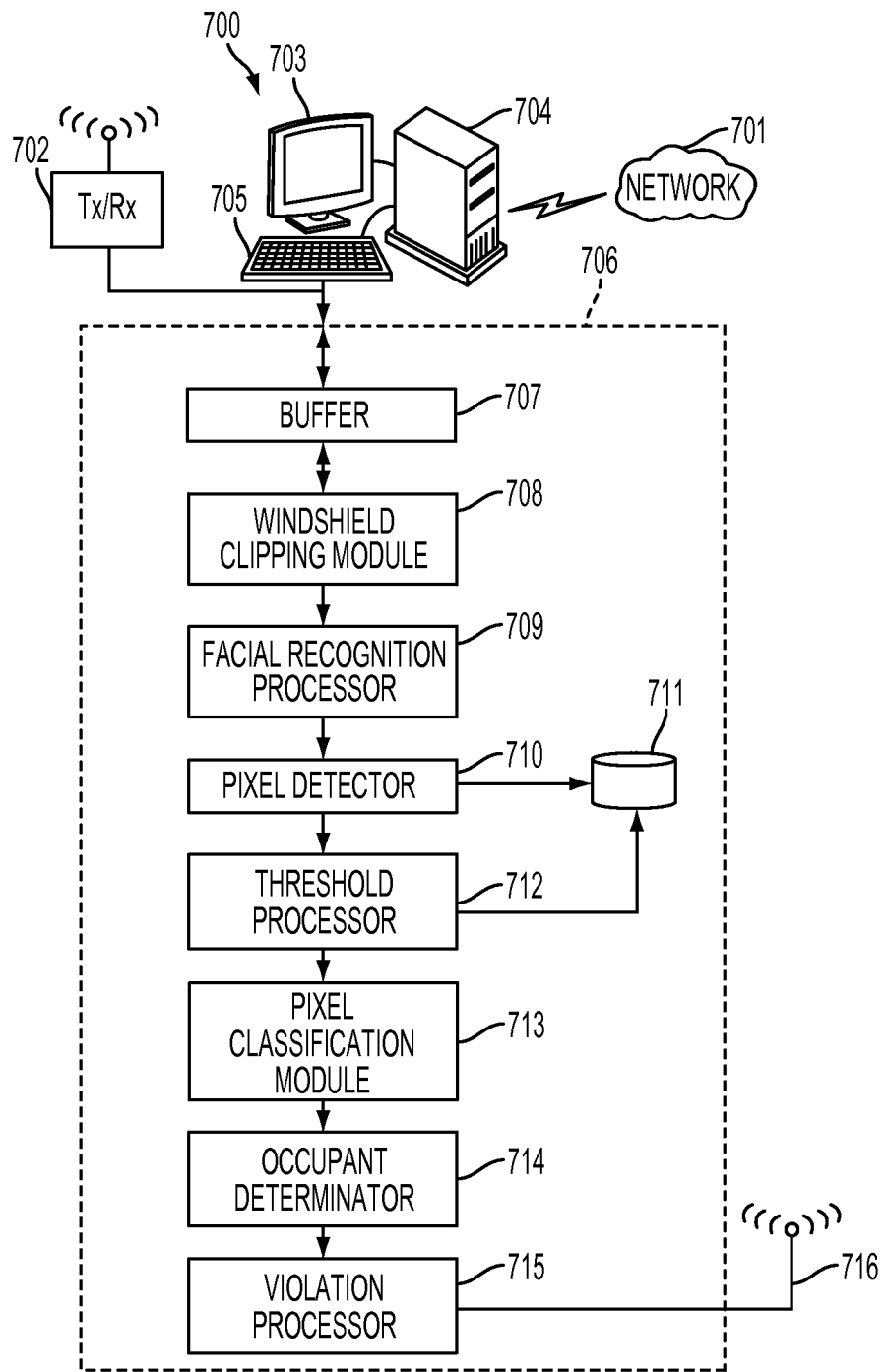
FIG. 7 is a block diagram of one example system capable of implementing various aspects of the present method shown and described with respect to the flow diagrams of FIGS. 5 and 6.

Reference is now being made to FIG. 7 which illustrates a block diagram of one example system capable of implementing various aspects of the present method shown and described with respect to the flow diagrams of FIGS. 5 and 6.

In FIG. 7, workstation 700 is shown having been placed in communication with receiver 702 for receiving the IR image from antenna 308 of FIG. 3, and for effectuating bi-directional communication between computer 700 and the IR detection system of FIG. 3. Computer system 700 is shown comprising a display 703 for enabling a display of information for a user input and a keyboard 705 for making a user selection such as, for example, the user identifying a windshield area of the received IR image or for a user to visually inspect an image in the instance where occupancy detection has failed. A user may use the graphical user interface to identify or select one or more portions of the IR image such as, for instance, candidate area 403 wherein a driver's facial area is likely to be found by a face detection algorithm, or for a user to manually identify the driver's facial region. Pixels identified or otherwise detected in the received image may be retrieved from a remote device over network 701. Various portions of the captured image of the motor vehicle intended to be processed in accordance with the teachings hereof, may be stored in a memory or storage device which has been placed in communication with workstation 700 or a remote device for storage or further processing over network 701 via a communications interface (not shown). Computer 700 and Tx/Rx element 702 are in communication with Image Processing Unit 706 which processes the received images in accordance with the teachings hereof.

Image Processing Unit 706 is shown comprising a buffer 707 for queuing received images for subsequent processing. Such a buffer may also be configured to store data, formulas, pixel classification methods, and other variables and representations needed to facilitate processing of the received IR image in accordance with the methods disclosed herein. Windshield Clipping Module 708 receives the next IR image from Buffer 707 and isolates and clips the windshield area of the motor vehicle from the image for subsequent processing (as shown in FIG. 4). Facial Recognition Processor 709 performs facial recognition on the image to identify a driver's head and facial region in the image. Processor 709 may be configured to receive a candidate region of the front windshield portion of the IR image likely to contain the driver's head and facial area (such as region 403 of FIG. 4) and process that region. The location of the identified driver's facial region is provided to Pixel Detector Module 710 which detects pixels of human tissue at those locations. Multi-spectral information associated with the human tissue pixels is provided to storage device 711. Various embodiments hereof involve cross-referencing pixel intensity values with calculated intensity values using known reflectances obtained from a storage device. In such an embodiment, device 711 further contains information such as, for example, a power spectra of the IR illuminator, a transmittance of a filter, and a responsivity curve of the IR detector, and other information needed by any of the pixel classification methods employed, as discussed with respect to Eqs. (1)-(6).

Module 710 communicates the multi-spectral information of the human tissue pixels of the driver's facial region to Threshold Processor 712 which calculates a pixel classification threshold in accordance with various embodiments disclosed herein depending on whether the pixel classification method is the correlation method or the ratio method. Pixel Classification Module receives the pixel classification threshold from Processor 712 and proceeds to classify pixels in the remainder of the IR image or a remainder of the clipped windshield area. Occupant Determinator 714 receives the classified pixels from the Pixel Classification Module and proceeds to determine the number of human occupants in the vehicle by grouping together human tissue pixels and counting the number of pixel groups (or blobs) determined to be individual human occupants in the vehicle. The number of human occupants is provided to Violation Processor 715 which proceeds to make a determination whether a traffic violation has occurred given the determined number of occupants and the time of day when the image was captured. If a traffic violation has occurred then Processor 715 initiates a signal, via Tx/Rx element 716, to a law enforcement or traffic authority that a vehicle has been detected to be traveling in a HOV/HOT lane without the requisite number of human occupants. The signal may include the original image and one or more aspects of the processed image. Law enforcement can then act accordingly.

It should be appreciated that any of the modules and/or processors of FIG. 7 are in communication with workstation 700 and with storage device 711 via communication pathways (shown and not shown) and may store/retrieve data, parameter values, functions, pages, records, data, and machine readable/executable program instructions required to perform their various functions. Each may further be in communication with one or more remote devices over network 701. Connections between modules and processing units are intended to include both physical and logical connections. It should be appreciated that some or all of the functionality of any of the modules or processing units of FIG. 7 may be performed, in whole or in part, by components internal to workstation 700 or by a special purpose computer system. One example special purpose computer system is shown and discussed with respect to the embodiment of FIG. 8.

It should also be appreciated that various modules may designate one or more components which may comprise software and/or hardware designed to perform the intended function. A plurality of modules may collectively perform a single function. Each module may have a specialized processor capable of executing machine readable program instructions which enable that processor to perform its intended function. A plurality of modules may be executed by a plurality of computer systems operating in parallel. Modules may further include one or more software/hardware modules which may further comprise an operating system, drivers, device controllers, and other apparatuses some or all of which may be connected via a network. It is also contemplated that one or more aspects of the present method may be implemented on a dedicated computer and may also be practiced in distributed computing environments where tasks are performed by remote devices that are linked via a network.

Example Special Purpose Computer

Figure 8:
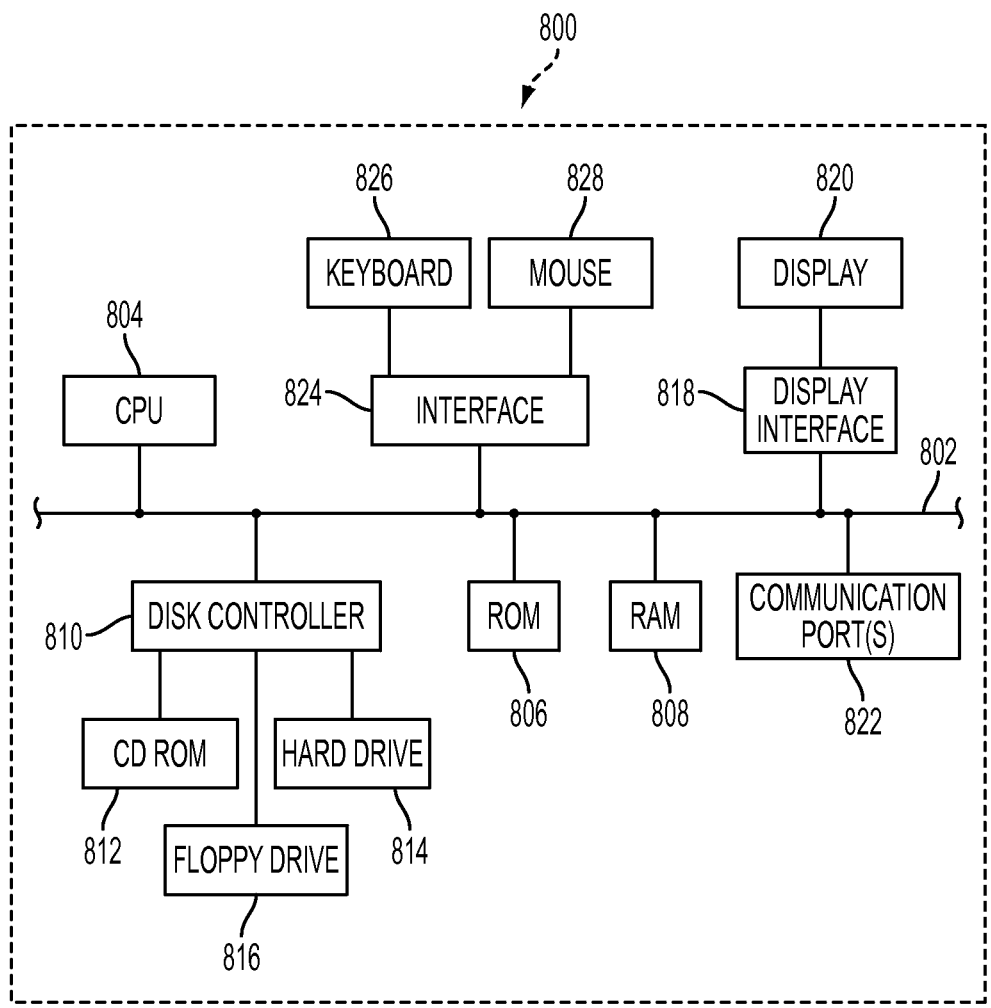
FIG. 8 illustrates a block diagram of one example special purpose computer for implementing various aspects of the present method as described with respect to the flow diagrams of FIGS. 5 and 6, and the various modules and processing units of the block diagram of FIG. 7.

Reference is now being made to FIG. 8 which illustrates a block diagram of one example special purpose computer for implementing various aspects of the present method as described with respect to the flow diagrams of FIGS. 5 and 6, and the various modules and processing units of the block diagram of FIG. 7. Such a special purpose processor is capable of executing machine executable program instructions and may comprise any of a micro-processor, micro-controller, ASIC, electronic circuit, or any combination thereof.

Special purpose processor 800 executes machine executable program instructions. Communications bus 802 serves as an information highway interconnecting the other illustrated components. The computer incorporates a central processing unit (CPU) 804 capable of executing machine readable program instructions for performing any of the calculations, comparisons, logical operations, and other program instructions for performing the methods disclosed herein. The CPU is in communication with Read Only Memory (ROM) 806 and Random Access Memory (RAM) 808 which, collectively, constitute storage devices. Such memory may be used to store machine readable program instructions and other program data and results. Controller 810 interfaces with one or more storage devices 814. These storage devices may comprise external memory, zip drives, flash memory, USB drives, memory sticks, or other storage devices with removable media such as CD-ROM drive 812 and floppy drive 816. Such storage devices may be used to implement a database wherein various records of objects are stored for retrieval. Example computer readable media is, for example, a floppy disk, a hard-drive, memory, CD-ROM, DVD, tape, cassette, or other digital or analog media, or the like, capable of having embodied thereon a computer readable program, logical instructions, or other machine readable/executable program instructions or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods herein. Display interface 818 effectuates the display of information on display device 820 in various formats such as, for instance, audio, graphic, text, and the like. Interface 824 effectuates a communication via keyboard 826 and mouse 828. Such a graphical user interface is useful for a user to review displayed information in accordance with various embodiments hereof. Communication with external devices may occur using example communication port(s) 822. Such ports may be placed in communication with the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via communication ports are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of a system, an operating system, a plug-in, or may be shipped, sold, leased, or otherwise provided separately either alone or as part of an add-on, update, upgrade, or product suite.

It will be appreciated that various of the above-disclosed and other features and functions, or alternatives hereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

The teachings of any printed publications including patents and patent applications, are each separately hereby incorporated by reference in their entirety.

What is claimed is:

1. A method for determining a threshold for pixel classification in a vehicle occupancy detection system, the method comprising:

receiving an IR image of a moving vehicle intended to be analyzed for passenger occupancy in the vehicle, said image having been captured using a multi-band IR imaging system comprising an IR detector and an IR Illuminator, said imaging system having collected intensity values for each pixel in said image;

detecting pixels of human tissue of a driver of said vehicle in said IR image; and using multi-spectral information of said detected human tissue pixels to determine a pixel classification threshold $C_{th}$ comprising:

$$C_{th}=C_m-\beta V_c,$$

where $C_m$ is a mean of correlation coefficient values of pixels of said driver's detected face, $V_c$ is a variance of said correlation, and $\beta$ is a constant.

2. The method of claim 1, further comprising using said pixel classification threshold to classify human tissue pixels in a remainder of said image, said pixels being classified according to a correlation method comprising:

$$C = \frac{\sum_{i=1}^{i=N}[I_{cm}(i)][I_{cs}(i)]}{\sqrt{\sum_{i=1}^{i=N}[I_{cm}(i)]^2}\sqrt{\sum_{i=1}^{i=N}[I_{cs}(i)]^2}},$$

where $I_{cm}(i)$ is a measured intensity of pixels of said passenger, $I_{cs}(i)$ is a facial intensity of the said driver, and N is the total number of wavelength band of said multi-band IR imaging system, said classification being based upon said correlation being larger or smaller than said threshold $C_{th}$.

3. The method of claim 1, further comprising:
clipping said image to a windshield area of said vehicle; and
analyzing said windshield area to determine an approximate location of a driver's side and a passenger side of said vehicle's front passenger compartment.

4. The method of claim 1, further comprising determining a number of human occupants in said vehicle based upon said pixel classifications.

5. The method of claim 4, further comprising alerting an authority in the instance where a front passenger seat is determined to not be occupied by a human occupant and said vehicle is traveling in a HOV/HOT lane.

6. A system for determining a threshold for pixel classification in a vehicle occupancy detection system, the system comprising:
a multi-band IR imaging sensor for capturing an IR image of a moving vehicle intended to be analyzed for passenger occupancy in the vehicle, said capture IR image comprising intensity values collected for each pixel in said image; and
a processor in communication with said imaging sensor and a memory, said processor executing machine readable instructions for performing:
detecting pixels of human tissue of a driver of said vehicle in said IR image; and
using multi-spectral information of said detected human tissue pixels to determine a pixel classification threshold $C_{th}$ comprising:

$$C_{th}=C_m-\beta V_c,$$

where $C_m$, is a mean of correlation coefficient values of pixels of said driver's detected face, $V_c$ is a variance of said correlation, and $\beta$ is a constant.

7. The system of claim 6, further comprising using said pixel classification threshold to classify human tissue pixels in a remainder of said image, said pixels being classified according to a correlation method comprising:

$$C = \frac{\sum_{i=1}^{i=N}[I_{cm}(i)][I_{cs}(i)]}{\sqrt{\sum_{i=1}^{i=N}[I_{cm}(i)]^2}\sqrt{\sum_{i=1}^{i=N}[I_{cs}(i)]^2}},$$

where $I_{cm}(i)$ is a measured intensity of pixels of said passenger, $I_{cs}(i)$ is a facial intensity of the said driver, and N is the total number of wavelength band of said multi-band IR imaging system, said classification being based upon said correlation being larger or smaller than said threshold $C_{th}$.

8. The system of claim 6, further comprising:
clipping said image to a windshield area of said vehicle; and
analyzing said windshield area to determine an approximate location of a driver's side and a passenger side of said vehicle's front passenger compartment.

9. The system of claim 6, further comprising determining a number of human occupants in said vehicle based upon said pixel classifications.

10. The system of claim 9, further comprising alerting an authority in the instance where a front passenger seat is determined to not be occupied by a human occupant and said vehicle is traveling in a HOV/HOT lane.

11. A method for determining a threshold for pixel classification in a vehicle occupancy detection system, the method comprising:
receiving an IR image of a moving vehicle intended to be analyzed for passenger occupancy in the vehicle, said image having been captured using a multi-band IR imaging system comprising an IR detector and an IR Illuminator, said imaging system having collected intensity values for each pixel in said image;
detecting pixels of human tissue of a driver of said vehicle in said IR image; and
using multi-spectral information of said detected human tissue pixels to determine a pixel classification threshold $S_{th}$ comprising:

$$S_{th}=S_m-\gamma V_s,$$

where $S_m$ is a mean of intensity ratio values of pixels of said driver's detected face, $V_s$ is a variance of said values, and $\gamma$ is a constant.

12. The method of claim 11, further comprising using said pixel classification threshold to classify human tissue pixels in a remainder of said image, said pixels being classified according to a ratio method comprising:

$$\frac{I_{cm}(i)}{I_{cm}(j)},$$

where i,j are any N-band indices different from each other, said classification being based upon whether said ratio is larger or smaller than said threshold.

13. The method of claim 11, further comprising:
clipping said image to a windshield area of said vehicle; and
analyzing said windshield area to determine an approximate location of a driver's side and a passenger side of said vehicle's front passenger compartment.

14. The method of claim 11, further comprising determining a number of human occupants in said vehicle based upon said pixel classifications.

15. The method of claim 11, further comprising alerting an authority in the instance where a front passenger seat is determined to not be occupied by a human occupant and said vehicle is traveling in a HOV/HOT lane.

16. A system for determining a threshold for pixel classification in a vehicle occupancy detection system, the system comprising:
- a multi-band IR imaging sensor for capturing an IR image of a moving vehicle intended to be analyzed for passenger occupancy in the vehicle, said capture IR image comprising intensity values collected for each pixel in said image; and
- a processor in communication with said imaging sensor and a memory, said processor executing machine readable instructions for performing:
    - detecting pixels of human tissue of a driver of said vehicle in said IR image; and
    - using multi-spectral information of said detected human tissue pixels to determine a pixel classification threshold $S_{th}$ comprising:

$$S_{th} = S_m - \gamma V_s,$$

where $S_m$ is a mean of intensity ratio values of pixels of said driver's detected face, $V_s$ is a variance of said values, and $\gamma$ is a constant.

17. The system of claim 16, further comprising using said pixel classification threshold to classify human tissue pixels in a remainder of said image, said pixels being classified according to a ratio method comprising:

$$\frac{I_{cm}(i)}{I_{cm}(j)},$$

where i,j are any N-band indices different from each other, said classification being based upon whether said ratio is larger or smaller than said threshold.

18. The system of claim 16, further comprising:
- clipping said image to a windshield area of said vehicle; and
- analyzing said windshield area to determine an approximate location of a driver's side and a passenger side of said vehicle's front passenger compartment.

19. The system of claim 16, further comprising determining a number of human occupants in said vehicle based upon said pixel classifications.

20. The system of claim 16, further comprising alerting an authority in the instance where a front passenger seat is determined to not be occupied by a human occupant and said vehicle is traveling in a HOV/HOT lane.

* * * * *